US012784993B2

(12) United States Patent
Yamamoto

(10) Patent No.: US 12,784,993 B2
(45) Date of Patent: Nov. 3, 2026

(54) ENERGY STORAGE APPARATUS

(71) Applicant: GS Yuasa International Ltd., Kyoto (JP)

(72) Inventor: Yuichiro Yamamoto, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 772 days.

(21) Appl. No.: 17/909,281

(22) PCT Filed: Feb. 1, 2021

(86) PCT No.: PCT/JP2021/003599

§ 371 (c)(1),
(2) Date: Sep. 2, 2022

(87) PCT Pub. No.: WO2021/176919

PCT Pub. Date: Sep. 10, 2021

(65) Prior Publication Data

US 2023/0084184 A1 Mar. 16, 2023

(30) Foreign Application Priority Data

Mar. 4, 2020 (JP) ................................ 2020-036560

(51) Int. Cl.
*H01G 9/00* (2006.01)
*H01G 2/02* (2006.01)
(Continued)

(52) U.S. Cl.
CPC ............ *H01G 9/0003* (2013.01); *H01G 2/02* (2013.01); *H01G 9/08* (2013.01); *H01M 10/486* (2013.01);
(Continued)

(58) Field of Classification Search
None
See application file for complete search history.

(56) References Cited

U.S. PATENT DOCUMENTS

2002/0182480 A1 12/2002 Hanauer et al.
2003/0223474 A1* 12/2003 Roepke .................... G01K 1/16 374/208

(Continued)

FOREIGN PATENT DOCUMENTS

EP 3 352 242 A1 7/2018
JP 2007-213940 A 8/2007

(Continued)

OTHER PUBLICATIONS

Machine Translation—WO 2018230523 A1 (Year: 2018).*

(Continued)

*Primary Examiner* — Ula C Ruddock
*Assistant Examiner* — Christina Renee Daulton
(74) *Attorney, Agent, or Firm* — MCGINN INTELLECTUAL PROPERTY LAW GROUP, PLLC

(57) ABSTRACT

An energy storage apparatus includes an energy storage device, a sensor mounted on the energy storage device, a holding member disposed on the energy storage device and holding the sensor in a state where a detection surface of the sensor is exposed toward the energy storage device and an outer case accommodating the energy storage device, the sensor, and the holding member.

21 Claims, 8 Drawing Sheets

(51) Int. Cl.

| | |
|---|---|
| ***H01G 9/08*** | (2006.01) |
| ***H01M 10/48*** | (2006.01) |
| ***H01M 50/209*** | (2021.01) |
| ***H01M 50/249*** | (2021.01) |
| ***H01M 50/507*** | (2021.01) |

(52) U.S. Cl.
CPC ....... *H01M 50/209* (2021.01); *H01M 50/249* (2021.01); *H01M 50/507* (2021.01); *H01M 2220/20* (2013.01)

(56) References Cited

U.S. PATENT DOCUMENTS

| | | | | |
|---|---|---|---|---|
| 2011/0104533 | A1 | 5/2011 | Seto | |
| 2017/0084885 | A1 | 3/2017 | Tononishi | |
| 2017/0092911 | A1* | 3/2017 | Nishikawa ............ | H01M 50/24 |
| 2017/0244139 | A1* | 8/2017 | Tononishi ............ | H01G 9/0029 |
| 2020/0176738 | A1 | 6/2020 | Tsuruta et al. | |

FOREIGN PATENT DOCUMENTS

| | | | | | |
|---|---|---|---|---|---|
| JP | 2011-040330 | A | | 2/2011 | |
| JP | 2011-096507 | A | | 5/2011 | |
| JP | 2012-230813 | A | | 11/2012 | |
| JP | 2014-165134 | A | | 9/2014 | |
| JP | 2015-125813 | A | | 7/2015 | |
| JP | 2016-136472 | A | | 7/2016 | |
| JP | 2017-059503 | A | | 3/2017 | |
| JP | 2017-152161 | A | | 8/2017 | |
| JP | 2017-224451 | A | | 12/2017 | |
| JP | 2018-125251 | A | | 8/2018 | |
| JP | WO2018/230523 | A1 | | 4/2020 | |
| KR | 20100006491 | U | * | 6/2010 | .......... H01M 10/052 |
| WO | WO-2018230523 | A1 | * | 12/2018 | ............. H01G 11/10 |

OTHER PUBLICATIONS

Machine Translation—KR 20100006491 U (Year: 2010).*
International Search Report (ISR) (PCT Form PCT/ISA/210), in PCT/JP2021/003599, dated Apr. 6, 2021.

* cited by examiner

ENERGY STORAGE APPARATUS

TECHNICAL FIELD

The present invention relates to an energy storage apparatus that includes a sensor mounted on an energy storage device.

BACKGROUND ART

Conventionally, there has been known an energy storage apparatus that includes energy storage devices, an outer case which accommodates the energy storage devices, and a holding member that is accommodated in the outer case and holds bus bars connected to the energy storage devices. Such an energy storage apparatus includes a sensor (thermistor) for detecting a state of the energy storage devices. The sensor is fixed to the energy storage devices in a state where the sensor is pressed against the energy storage device by the holding member. (See, for example, Patent Document 1).

PRIOR ART DOCUMENT

Patent Document

Patent Document 1: JP-A-2017-152161

SUMMARY OF THE INVENTION

Problems to be Solved by the Invention

The energy storage apparatus described above adopts the structure where the sensor is held and pressed against the energy storage device. On the other hand, in order to simplify the structure, in recent years, a method has been also studied where a sensor is made to adhere to an energy storage device using an adhesive. However, when the sensor is made to adhere to the energy storage device using an adhesive, there is a concern that a state of the energy storage device cannot be accurately detected attributed to the adhesive.

Accordingly, it is an object of the present invention to provide an energy storage apparatus that can detect a state of an energy storage device more accurately.

Means for Solving the Problems

According to an aspect of the present invention, there is provided an energy storage apparatus that includes: an energy storage device; a sensor mounted on the energy storage device;

a holding member disposed on the energy storage device and holding the sensor in a state where a detection surface of the sensor is exposed toward the energy storage device; and an outer case accommodating the energy storage device, the sensor, and the holding member therein, wherein an adhesive layer that joins the holding member and the energy storage device to each other is interposed between the holding member and the energy storage device, and the adhesive layer is disposed at a position where the adhesive layer does not overlap with the detection surface of the sensor as viewed in a plan view.

With such a configuration, the adhesive layer that joins the holding member and the energy storage device to each other is disposed at a position where the adhesive layer does not overlap with the detection surface of the sensor as viewed in a plan view. Accordingly, a state of the energy storage device can be detected more accurately.

According to an aspect of the present invention, there is provided an energy storage apparatus that includes: an energy storage device; a sensor mounted on the energy storage device;

a holding member disposed on the energy storage device and holding the sensor in a state where a detection surface of the sensor is exposed toward the energy storage device; and an outer case accommodating the energy storage device, the sensor, and the holding member therein, wherein a heat conductive adhesive layer that joins the sensor and the energy storage device to each other is interposed between the detection surface of the sensor and the energy storage device.

With such a configuration, the heat conductive adhesive layer that joins the sensor and the energy storage device to each other is interposed between the detection surface of the sensor and the energy storage device. Accordingly, a state of the energy storage device can be detected more accurately.

Advantages of the Invention

According to the energy storage apparatus of the present invention, a state of the energy storage device can be detected more accurately.

MODE FOR CARRYING OUT THE INVENTION

Figure 1:
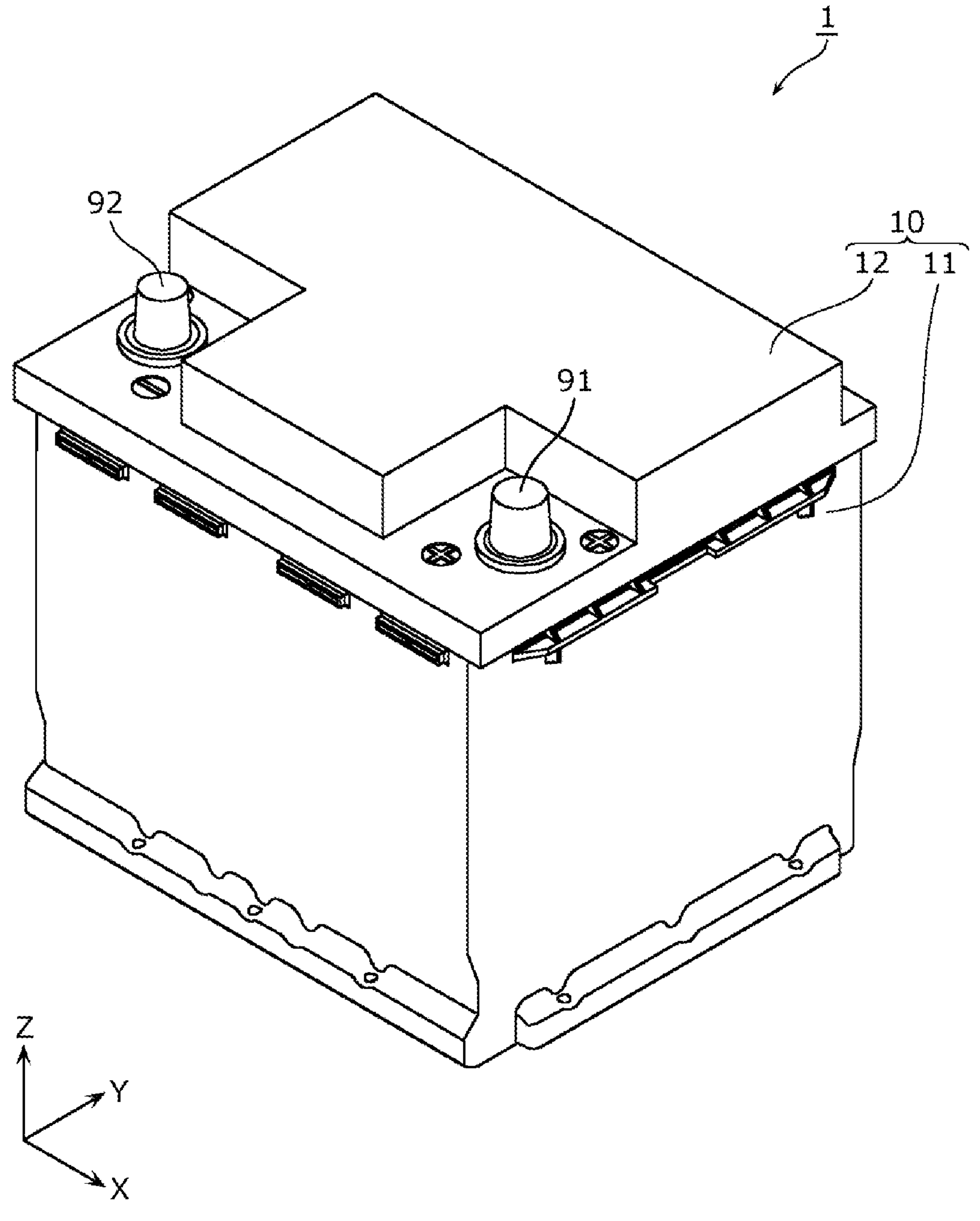
FIG. 1 is a perspective view illustrating an external appearance of an energy storage apparatus according to an embodiment.

The inventors of the present application have found that there are two factors as reasons that a state of an energy storage device cannot be accurately detected in making a sensor adhere to the energy storage device using an adhesive. The first factor is that the adhesive is interposed between the sensor and the energy storage device so that the sensor receives buoyancy from the adhesive and hence, a state of the energy storage device cannot be accurately detected. The second factor is that the adhesive is interposed between the sensor and the energy storage device and hence, thermal conductivity is lowered. Accordingly, a state of the energy storage device cannot be accurately detected.

According to an aspect of the present invention, there is provided an energy storage apparatus that includes: an energy storage device; a sensor mounted on the energy storage device;

a holding member disposed on the energy storage device and holding the sensor in a state where a detection surface of the sensor is exposed toward the energy storage device; and an outer case accommodating the energy storage device, the sensor, and the holding member therein, wherein an adhesive layer that joins the holding member and the energy storage device to each other is interposed between the holding member and the energy storage device, and the adhesive layer is disposed at a position where the adhesive layer does not overlap with the detection surface of the sensor as viewed in a plan view.

With such a configuration, the adhesive layer that joins the holding member and the energy storage device to each other is disposed at the position where the adhesive layer does not overlap with the detection surface of the sensor as viewed in a plan view. Accordingly, it is possible to prevent the sensor from receiving buoyancy from an adhesive that forms the adhesive layer. Accordingly, the contact property of the sensor that is brought into contact with the energy storage device can be enhanced even when a biasing portion for pressing the sensor is not provided.

The adhesive layer is disposed at the position where the adhesive layer does not overlap with the detection surface of the sensor as viewed in a plan view. Accordingly, the adhesive layer is not interposed on a heat conduction path that connects the energy storage device and the detection surface of the sensor to each other. As a result, the lowering of thermal conductivity attributed to the adhesive layer can be minimized. In this manner, a state of the energy storage device can be more accurately detected by enhancing the contact property of the sensor and by suppressing the lowering of thermal conductivity.

The detection surface of the sensor may protrude from the holding member toward the energy storage device, and a protruding amount of the detection surface from the holding member may be equal to or more than a thickness of the adhesive layer.

With such a configuration, the protruding amount of the detection surface of the sensor from the holding member is equal to or more than the thickness of the adhesive layer. Accordingly, even when the holding member intends to float from a predetermined position by receiving buoyancy from the adhesive, it is possible to bring the detection surface into contact with the energy storage device with more certainty.

An opening portion may be formed on a surface of the holding member that faces the adhesive layer and outward the detection surface of the sensor.

The adhesive layer is formed by applying an adhesive to the energy storage device or the holding member, by bringing the energy storage device and the holding member close to each other, and by pressing the energy storage device and the holding member to each other. During pressing, an adhesive spreads in a wetted form between the energy storage device and the holding member. The opening portion is formed on the holding member and outward the detection surface. Accordingly, an adhesive that approaches the detection surface by spreading in a wetted form intrudes into the opening portion. Therefore, it is possible to prevent the adhesive from spreading in a wetted form toward a region in the vicinity of the detection surface. That is, it is possible to prevent the sensor from receiving buoyancy attributed to the adhesive with more certainty.

The holding member may hold a bus bar that is connected to the energy storage device, the bus bar may be disposed at an end portion of the holding member, and the sensor may be disposed at a middle portion of the holding member.

It is desirable that the holding member be strongly fixed to the energy storage device in the vicinity of the bus bar. Therefore, it is necessary to sufficiently apply an adhesive to the end portion of the holding member where the bus bar is disposed. On the other hand, the middle portion of the holding member is away from the bus bar. Accordingly, it is also possible to suppress an amount of adhesive to be applied to the middle portion. The sensor is disposed at the middle portion of the holding member. Accordingly, even in a case where the adhesive layer is disposed while avoiding the periphery of the detection surface of the sensor, the fixing of the holding member is not significantly affected. Accordingly, the holding member can enhance the contact property of the sensor that is brought into contact with the energy storage device while firmly fixing a region of the holding member in the vicinity of the bus bar.

The sensor may have a pair of support portions that sandwiches the detection surface, and the pair of support portions may be supported by the holding member.

With such a configuration, the sensor is supported on the holding member by the pair of support portions that sandwiches the detection surface. Accordingly, it is possible to make the sensor minimally float even when the sensor receives buoyancy from the adhesive. Therefore, it is possible to bring the detection surface into contact with the energy storage device with more certainty.

The adhesive layer may be disposed while avoiding the periphery of the detection surface.

With such a configuration, the adhesive layer is disposed while avoiding the periphery of the detection surface and hence, an adhesive that forms the adhesive layer minimally spreads in a wetted form to the detection surface. Accordingly, it is possible to prevent the sensor from receiving buoyancy attributed to the adhesive with more certainty.

According to an aspect of the present invention, there is provided an energy storage apparatus that includes: an energy storage device; a sensor mounted on the energy storage device;

a holding member disposed on the energy storage device and holding the sensor in a state where a detection surface of the sensor is exposed toward the energy storage device; and an outer case accommodating the energy storage device, the sensor, and the holding member therein, wherein a heat conductive adhesive layer that joins the sensor and the energy storage device to each other is interposed between the detection surface of the sensor and the energy storage device.

With such a configuration, the heat conductive adhesive layer that joins the sensor and the energy storage device to each other is disposed between the detection surface of the sensor and the energy storage device. Accordingly, it is possible to suppress lowering of thermal conductivity on a heat conductive path that connects the energy storage device and the detection surface of the sensor to each other. Accordingly, a state of the energy storage device can be detected with more certainty.

Hereinafter, the energy storage apparatus according to an embodiment of the present invention is described with reference to drawings. The embodiment of the present invention described hereinafter describes both a comprehensive example and specific examples. In the following embodiment, numerical values, shapes, materials, constituent elements, arrangement positions and connection modes of the constituent elements, and the like are provided as one example, and are not intended to limit the present invention. In the respective drawings, sizes and the like are not strictly illustrated.

In the following description and drawings, an arrangement direction along which a plurality of energy storage devices are arranged, a direction in which a pair of long side surfaces of a case of one energy storage device face each other, or a thickness direction of the container is defined as an X-axis direction. A direction along which electrode terminals of one energy storage device are arranged or a direction in which a pair of short side surfaces of a case of one energy storage device face each other is defined as a Y-axis direction. A direction along which a body portion and an outer lid of an outer case of the energy storage apparatus are arranged or a vertical direction is defined as a Z-axis direction. The Z axis direction is also an insertion direction when a plurality of energy storage devices are inserted into a body opening portion of the body portion. These X-axis direction, Y-axis direction, and Z-axis direction are directions that intersect with each other (orthogonal to each other in the embodiment described later). A case is considered where the Z-axis direction is not the vertical direction depending on a use mode. However, in the description made hereinafter, for the sake of convenience of the description, the description is made by assuming the Z-axis direction as the vertical direction. In the description made hereinafter, for example, an X-axis positive direction side indicates an arrow direction side of the X-axis, and an X-axis negative direction side indicates a side opposite to the X-axis positive direction side. The same goes for the Y-axis direction and the Z-axis direction. Expressions indicating the relative directions or the relative postures such as "parallel" or "orthogonal" also include cases where such directions or postures are not taken in a strict meaning of the terms. A state where two directions are orthogonal to each other means not only a state where these two directions are completely orthogonal to each other but also a state where these two directions are substantially orthogonal to each other, that is, for example, a state where these two directions are not orthogonal to each other with slight deviation of approximately several percent.

[Description of Overall Configuration of Energy Storage Apparatus]

Figure 2:
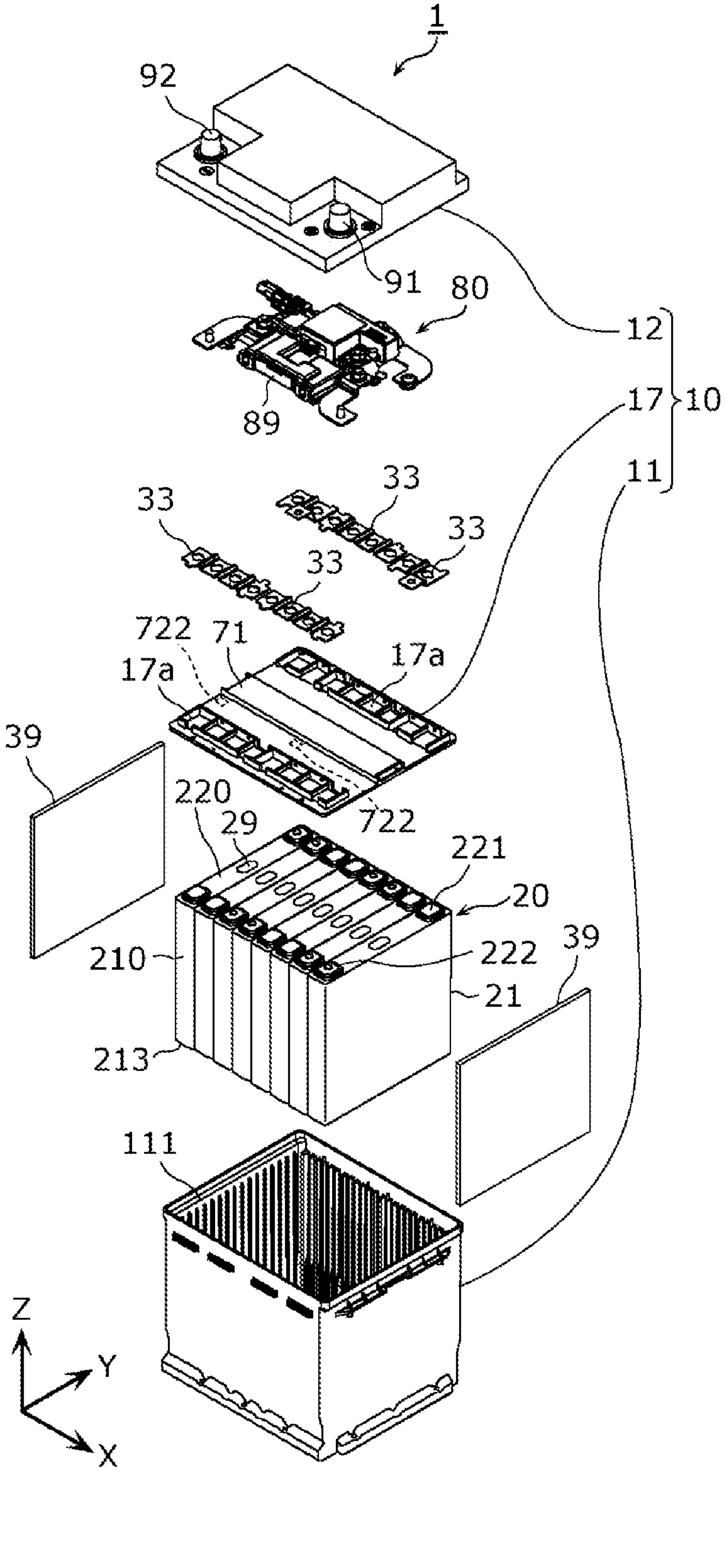
FIG. 2 is an exploded perspective view of the energy storage apparatus according to the embodiment illustrating respective constituent elements in a state where the energy storage apparatus is disassembled.

The overall configuration of an energy storage apparatus 1 according to the embodiment will be described with reference to FIG. 1 and FIG. 2. FIG. 1 is a perspective view illustrating an external appearance of the energy storage apparatus 1 according to the embodiment. FIG. 2 is an exploded perspective view of the energy storage apparatus 1 according to the embodiment illustrating respective constituent elements in a state where the energy storage apparatus 1 is disassembled.

The energy storage apparatus 1 is an apparatus in which electricity is charged from the outside and from which electricity is discharged to the outside. In the embodiment, the energy storage apparatus 1 has an approximately rectangular parallelepiped shape. The energy storage apparatus 1 is a battery module (assembled battery) used in an electricity storage application, a power source application, or the like. To be more specific, the energy storage apparatus 1 is used as a battery or the like for driving a mobile body such as an automobile, a motorcycle, a watercraft, a ship, a snowmobile, an agriculture machine, a construction machine, or a railway vehicle for an electric railway, or is used as a battery for starting an engine of the mobile body. As the above-described automobile, an electric vehicle (EV), a hybrid electric vehicle (HEV), a plug-in hybrid electric vehicle (PHEV), and a gasoline automobile are exemplified. As the above-described railway vehicle for an electric railway, an electric train, a monorail, and a linear motor car are exemplified. The energy storage apparatus 1 can also be used as a stationary battery or the like used as a home-use battery, a generator, or the like.

As illustrated in FIG. 1 and FIG. 2, the energy storage apparatus 1 includes energy storage devices 20 and an outer case 10 that accommodates the plurality of energy storage devices 20. The outer case 10 includes: a body portion 11 that accommodates the plurality of energy storage devices 20, a bus bar frame 17 that is disposed above the plurality of energy storage devices 20, and an outer lid 12 that covers an upper portion of the bus bar frame 17.

The outer case 10 is a container (module case) having a rectangular shape (box shape) that forms an outer case of the energy storage apparatus 1. That is, the outer case 10 is a member that fixes the plurality of energy storage devices 20, the bus bar frame 17 and the like at predetermined positions, and protects these elements from an impact or the like.

The body portion 11 is a bottomed rectangular cylindrical member whose upper portion is opened, and the opened portion forms a body opening portion 111. The body opening portion 111 has a substantially quadrangular shape as viewed in a plan view. In the inside of the body opening portion 111 of the body portion 11, besides the plurality of energy storage devices 20 and the bus bar frame 17, a plurality of bus bars 33 that are held by the bus bar frame 17, a connection unit 80 that includes a control circuit and the like, and a pair of end plates 39 are accommodated.

The outer lid 12 is a member having a rectangular shape that closes the body opening portion 111 of the body portion 11. The outer lid 12 is joined to the body portion 11 in a state where the outer lid 12 covers the body opening portion 111 of the body portion 11. The outer lid 12 has: an external terminal 91 on a positive electrode side; and an external terminal 92 on a negative electrode side. The external terminals 91 and 92 are electrically connected to the plurality of energy storage devices 20 via the connection unit 80 and the bus bars 33. The energy storage apparatus 1 charges electricity from the outside and discharges electricity to the outside via the external terminals 91, 92. The external terminals 91, 92 are respectively formed of a conductive member made of metal such as a copper alloy like brass, copper, aluminum, or an aluminum alloy.

The body portion 11 and the outer lid 12 of the outer case 10 are made of an insulating member such as polycarbonate (PC), polypropylene (PP), polyethylene (PE), polystyrene (PS), a polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene/perfluoroalkyl vinyl ether (PFA), polytetrafluoroethylene (PTFE), polyether sulfone (PES), an ABS resin, or a composite material of the above-mentioned materials, or metal to which insulation coating is applied. With such a configuration, the outer case 10 prevents the energy storage devices 20 and the like from coming into contact with metal members or the like outside the outer case 10. The outer case 10 may be formed of a conductive member made of metal or the like provided that the electric insulation property of the energy storage device 20 and the like is ensured.

The energy storage device 20 is a secondary battery (battery cell) that can charge electricity and discharge electricity. More specifically, the energy storage device 20 is a nonaqueous electrolyte secondary battery such as a lithium ion secondary battery. The energy storage device 20 has a flat rectangular parallelepiped shape (prismatic shape). In this embodiment, eight pieces of energy storage devices 20 are arranged side by side in the X-axis direction. The shape of the energy storage device 20 and the number of energy storage devices 20 arranged in the X-axis direction are not limited. The energy storage device 20 is not limited to a nonaqueous electrolyte secondary battery. The energy storage device 20 may be a secondary battery other than the nonaqueous electrolyte secondary battery, a capacitor, or a primary battery in which electricity is already charged even when a user does not charge the battery. The energy storage device 20 may be a battery that uses a solid electrolyte.

Figure 3:
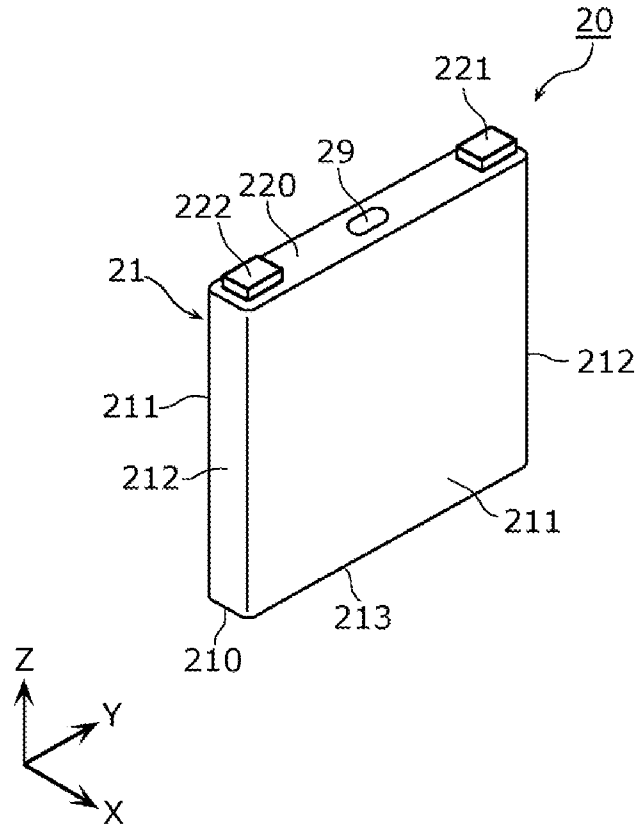
FIG. 3 is a perspective view illustrating an external appearance of an energy storage device according to the embodiment.

FIG. 3 is a perspective view illustrating an external appearance of the energy storage device 20 according to the embodiment. As illustrated in FIG. 3, the energy storage device 20 includes a container 21, and a pair of electrode terminals (a positive electrode terminal 221 and a negative electrode terminal 222). In the container 21, an electrode assembly, a pair of current collectors (the current collector on a positive electrode side and the current collector on a negative electrode side), an electrolyte solution (nonaqueous electrolyte), and the like are accommodated. However, these constituent elements are not illustrated in the drawing. A kind of the electrolyte solution is not particularly limited, and various kinds of electrolyte solutions can be selected provided that the performance of the energy storage device 20 is not impaired by the electrolyte solution. A gasket or the like is disposed between the container 21 and the pair of electrode terminals and the pair of current collectors in order to enhance insulation and gas-tightness. However, the illustration of the gasket or the like is also omitted. Besides the constituent elements described above, the energy storage device 20 may further include spacers disposed on the sides of the electrode assembly or below the electrode assembly, an insulating film that encloses the electrode assembly and the like, and the like.

The container 21 is a case having a rectangular a parallelepiped shape (a prismatic shape or a box shape). The container 21 includes: a container body 210 that has an opening; and a lid body 220 that closes the opening of the container body 210. With such a configuration, the container 21 has the structure where the electrode assembly and the like are accommodated in the inside of the container body 210 and, thereafter, the container body 210 and the lid body 220 are joined to each other by welding or the like so that the inside of the container 21 is sealed. The material of the container 21 is not particularly limited. However, for example, it is preferable that the container 21 be made of metal that is weldable such as stainless steel, aluminum, an aluminum alloy, iron, or a plated steel plate.

The container body 210 is a member that has a rectangular cylindrical shape and a bottom, and forms the body portion of the container 21. An opening is formed on an end of the container body 210 on the Z-axis positive direction side. That is, as illustrated in FIG. 3, the container body 210 has: a pair of long side surfaces 211 on side surfaces of the container body 210 on both sides in the X-axis direction; a pair of short side surfaces 212 on side surfaces of the container body 210 on both sides in the Y-axis direction; and a bottom surface 213 on a Z-axis negative direction side.

The lid body 220 is a plate-shaped member having a rectangular shape that forms a lid portion of the container 21. The lid body 220 is disposed on the container body 210 on a Z-axis positive direction side, and extends in the Y-axis direction. On the lid body 220, an electrolyte solution filling portion (not illustrated in the drawing) through which the container 21 is filled with an electrolyte solution, a gas release valve 29 that releases a pressure in the container 21 by discharging a gas when such a pressure is increased, and the like are also mounted.

The positive electrode terminal 221 and the negative electrode terminal 222 are respectively formed of a conductive member made of metal such as aluminum, an aluminum alloy, copper, or a copper alloy. The positive electrode terminal 221 and the negative electrode terminal 222 are mounted on the lid body 220. Specifically, the positive electrode terminal 221 and the negative electrode terminal 222 are electrode terminals disposed in a protruding manner from the lid body 220 of the container 21 toward the bus bar frame 17 side (upward, that is, toward the Z-axis positive direction side). The positive electrode terminal 221 and the negative electrode terminal 222 are connected to the external terminals 91, 92 via at least one bus bar 33 and the connection unit 80. With such a configuration, the energy storage apparatus 1 can charge electricity from the outside, and can discharge electricity to the outside.

The electrode assembly is an energy storage element (power generating element) formed by stacking a positive electrode plate, a negative electrode plate, and a separator to each other. The positive electrode plate is formed such that a positive active material layer is formed on a positive electrode substrate layer that is a current collecting foil made of metal such as aluminum or an aluminum alloy. The negative electrode plate is formed such that a negative active material layer is formed on a negative electrode substrate layer that is a current collecting foil made of metal such as copper or a copper alloy. As an active material used for forming the positive active material layer and an active material used for forming the negative active material layer, known materials can be appropriately used provided that these materials can occlude and discharge lithium ions. The electrode assembly may be an electrode assembly in any form such as a winding-type electrode assembly formed by winding plates (a positive electrode plate and a negative electrode plate), a stacking-type (stacked-type) electrode assembly formed by stacking a plurality of plate-shaped plates, or a bellows-type electrode assembly formed by folding plates in a bellows shape.

The current collectors are members (the positive electrode current collector and the negative electrode current collector) having conductivity and rigidity. The current collectors are electrically connected to the electrode terminals (positive electrode terminal 221 and the negative electrode terminal 222) and the electrode assembly. The positive electrode current collector is made of aluminum, an aluminum alloy or the like substantially in the same manner as the positive electrode substrate layer of the positive electrode plate. The negative electrode current collector is made of copper, a copper alloy, or the like substantially in the same manner as the negative electrode substrate layer of the negative electrode plate.

The bus bar 33 is a rectangular plate-like member which is disposed on at least two energy storage devices 20 in a state where the bus bar 33 is held by the bus bar frame 17. The bus bar 33 electrically connects the positive electrode terminal 221 and the negative electrode terminal 222 of such at least two energy storage devices 20. The bus bar 33 is formed of a conductive member made of metal such as copper, a copper alloy, aluminum, an aluminum alloy, nickel, a clad material or the like. In the embodiment, using five bus bars 33, four sets of energy storage device groups are formed where two energy storage devices 20 are connected with each other in parallel in each energy storage device group. Then, four sets of energy storage device groups are connected in series.

The connection unit 80 is a unit that includes a plurality of bus bars, a control board, and the like, and connects an energy storage device group consisting of eight energy storage devices 20 and the external terminals 91 and 92 to each other. The control board that the connection unit 80 includes has a plurality of electric components. Using the plurality of electric components, a detection circuit that detects a state of each energy storage device 20, a control circuit that controls charging and discharging of the energy storage devices 20, and the like are formed. The connection unit 80 includes a connector portion 89 of the detection circuit or the control circuit. In the embodiment, the connection unit 80 is fixed to the bus bar frame 17. The detection circuit and the control circuit may be formed separately on individual boards. The connection unit 80 may not have the control board. In this case, a control device disposed outside the energy storage apparatus 1 may control charging and discharging of respective energy storage devices 20. Sensors 81 (see FIG. 4) that are mounted on the energy storage devices 20 are electrically connected to the detection circuit. The sensor 81 is a sensor that detects a state of the energy storage device 20. Specifically, as an example of the sensor 81, a temperature sensor (thermistor) that detects a temperature of the energy storage device 20, a voltage sensor that detects a voltage of the energy storage device 20, or the like is named.

The bus bar frame 17 is an example of a holding member that is disposed over the plurality of energy storage devices 20 (a side where the positive electrode terminals 221 and the negative electrode terminals 222 are disposed). In this embodiment, the bus bar frame 17 is a member that holds the bus bars 33 and the sensors 81 mounted on the energy storage devices 20. More specifically, the bus bar frame 17 is a member that holds the plurality of bus bars 33, the connection unit 80, the sensors 81, and other wirings and the like (not illustrated), and can perform restricting of the positions of these members and the like. A plurality of bus bar opening portions 17*a* are formed in the bus bar frame 17. The plurality of bus bar opening portions 17*a* are provided for respectively holding the plurality of bus bars 33. Apart of each of the plurality of bus bars 33 is exposed to a side where the plurality of energy storage devices 20 are disposed through the corresponding bus bar opening portion 17*a*. The bus bar frame 17 is fixed to the body portion 11. With such a configuration, the bus bar frame 17 also performs a function of restricting the upward movement (toward a Z-axis positive direction side) of the plurality of energy storage devices 20.

There may be a case where the bus bar frame 17 that is disposed over the plurality of energy storage devices 20 is also referred to as a "bus bar plate", an "intermediate lid" or the like. The bus bar frame 17 is formed of an insulating member made of a material such as PC, PP, PE, PS, PPS, PPE (including modified PPE), PET, PBT, PEEK, PFA, PTFE, PES, an ABS resin, or a composite material of these materials, or metal to which insulation coating is applied.

The end plates 39 that form a pair are rectangular plate bodies that are disposed at the positions where the end plates 39 collectively sandwich the plurality of energy storage devices 20 in the body portion 11. To be more specific, the end plates 39 that form a pair are disposed at the positions where the end plates 39 sandwich the plurality of energy storage devices 20 in the X axis direction in a posture where the end plates 39 are arranged parallel to a YZ plane. That is, the end plates 39 that form a pair are disposed so as to overlap with the long side surfaces 211 of the containers 21 of the energy storage devices 20 disposed on the outermost sides. The end plate 39 is made of a metal to which insulation coating is applied or the like.

[Assembled Structure of Bus Bar Frame and Sensors]

Figure 4:
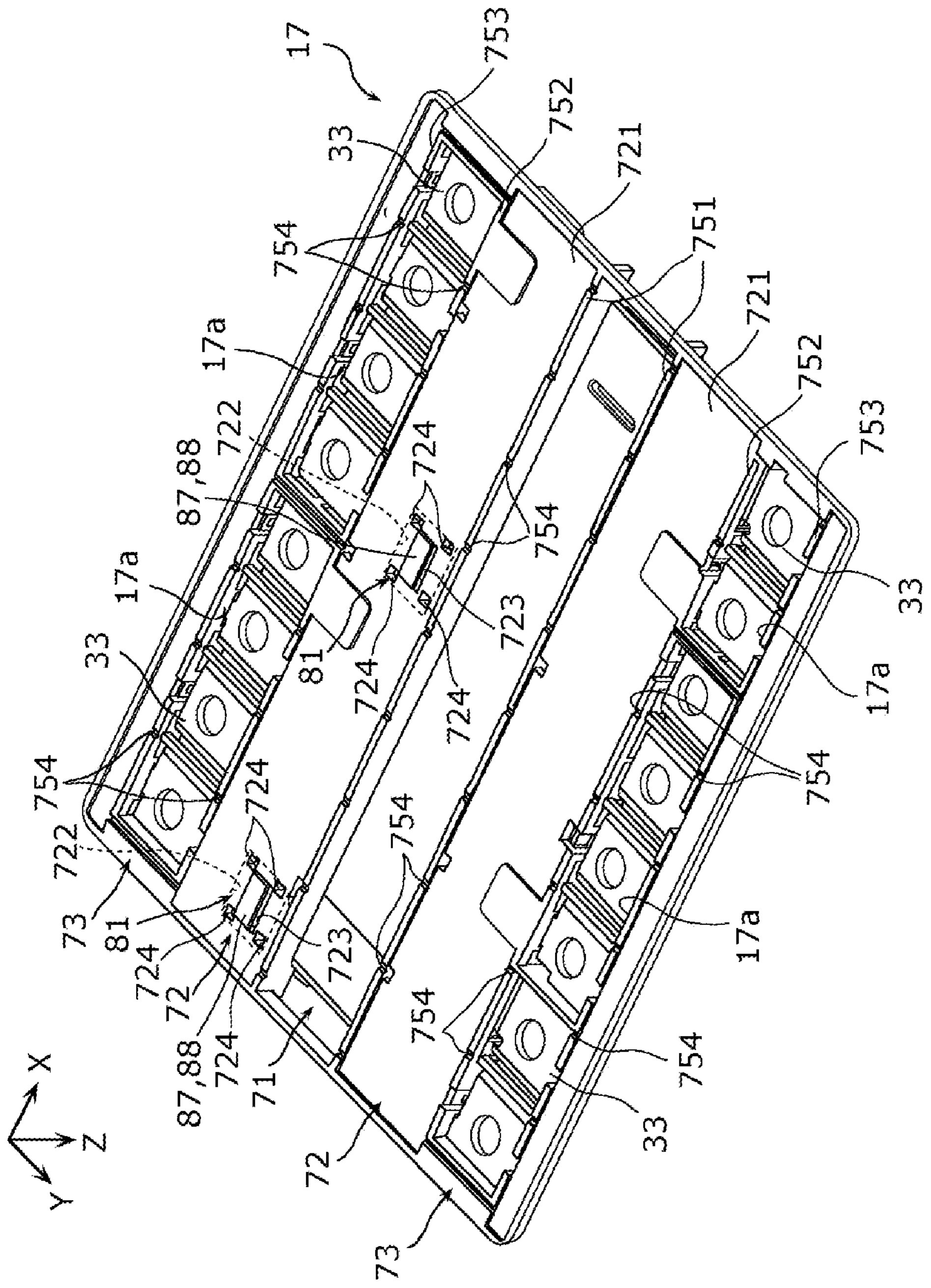
FIG. 4 is a perspective view illustrating a bus bar frame according to the embodiment.
Figure 5:
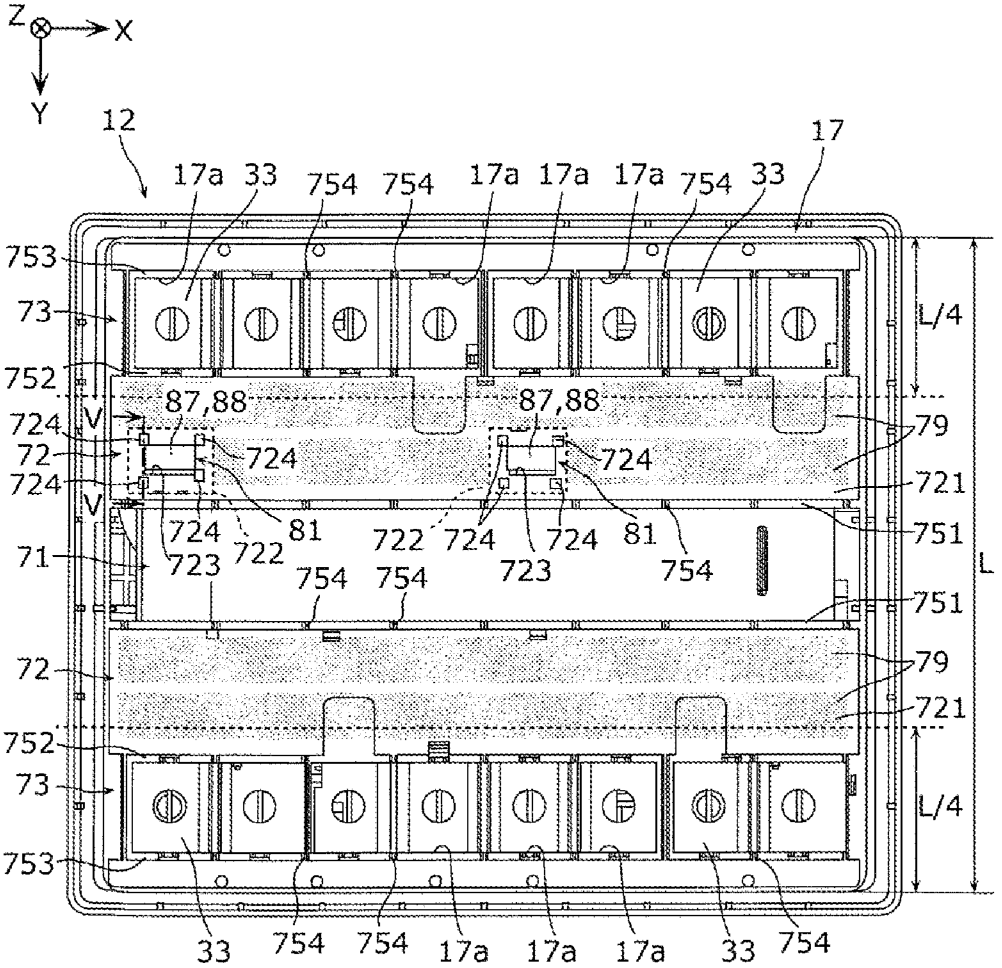
FIG. 5 is a plan view illustrating the bus bar frame according to the embodiment.
Figure 6:
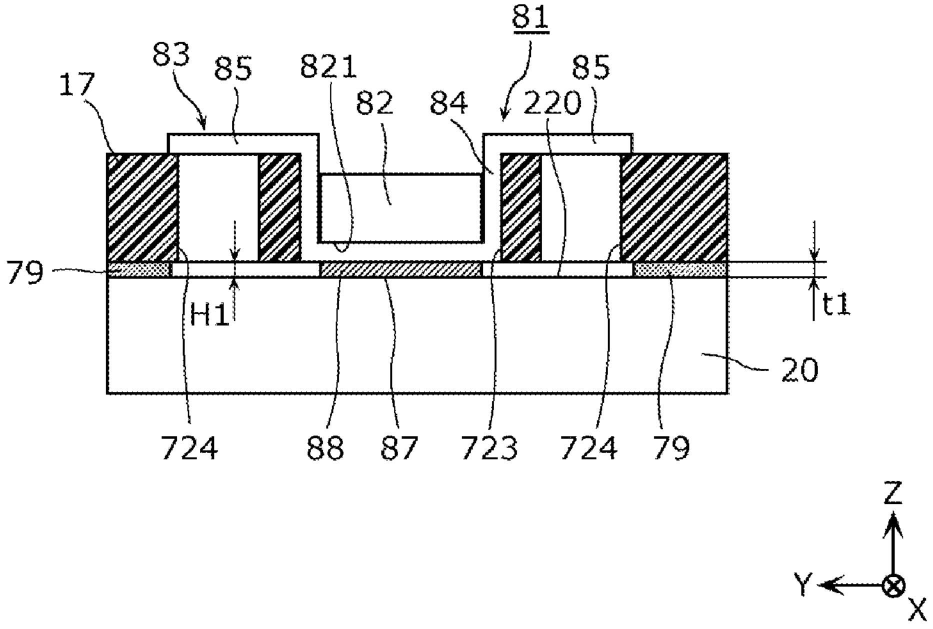
FIG. 6 is a cross-sectional view illustrating assembled structure formed of the bus bar frame and a sensor according to the embodiment.

Next, an assembled structure of the bus bar frame 17 and the sensors 81 is described. FIG. 4 is a perspective view illustrating the bus bar frame 17 according to the embodiment. Specifically, FIG. 4 is a perspective view of the bus bar frame 17 as viewed from below. FIG. 5 is a plan view illustrating the bus bar frame 17 according to the embodiment. In FIG. 5, a state of the bus bar frame 17 after an adhesive is applied to the bus bar frame 17 is illustrated. Specifically, FIG. 5 is a view of the outer lid 12 and the bus bar frame 17 as viewed from below. In FIG. 5, a state of the bus bar frame 17 after an adhesive is applied to the bus bar frame 17 is illustrated. FIG. 6 is a cross-sectional view illustrating the assembled structure that is formed of the bus bar frame 17 and the sensors 81 according to the embodiment. Specifically, FIG. 6 is a cross-sectional view taken along line V-V in FIG. 5.

First, the bus bar frame 17 is described in detail. As illustrated in FIG. 4 and FIG. 5, the bus bar frame 17 includes a gas path portion 71, adhesive portions 72, and bus bar mounting portions 73. These portions 71, 72 and 73 are defined by a plurality of pairs of ribs 751 to 753.

The gas path portion 71 is a portion that is disposed at a middle portion of the bus bar frame 17 in the Y axis direction, and extends in the X axis direction. The gas path portion 71 is a path for a gas discharged from the gas release valves 29 of the energy storage devices 20.

The adhesive portions 72 are a pair of portions that sandwiches the gas path portion 71 in the Y axis direction. The adhesive portions 72 extend in the X axis direction respectively. The adhesive portion 72 includes an adhesive region 721 and sensor regions 722. In the adhesive region 721, adhesive layers 79 (illustrated by dotted hatching in FIG. 5) that make the bus bar frame 17 and the plurality of energy storage devices 20 adhere to each other are laminated (applied). That is, in the adhesive portion 72, a surface of the adhesive portion 72 forms a surface that faces the adhesive layer 79.

The sensor region 722 is a region where a detection surface 87 of the sensor 81 is exposed. In FIG. 5, the sensor region 722 is indicated by a rectangular shape drawn by a broken line. Assuming a total length of the bus bar frame 17 in the Y axis direction as L, the sensor regions 722 are disposed at positions closer to a middle portion than an end portion of the bus bar frame 17 on a Y-axis negative direction side by a length of L/4. Two sensor regions 722 are disposed on the adhesive portion 72 on the Y-axis negative direction side out of the pair of adhesive portions 72. One sensor region 722 corresponds to the energy storage device 20 located on the X-axis most negative direction side, and the other sensor region 722 corresponds to the fourth energy storage device 20 counted from an end of the bus bar frame 17 on the X-axis positive direction side. In other words, two sensor regions 722 are spaced apart from each other in the X axis direction along which the plurality of energy storage devices 20 are arranged. A first opening portion 723 and a plurality of second opening portions 724 are formed in the sensor region 722. The first opening portion 723 is formed for exposing the detection surface 87 of the sensor 81. The plurality of second opening portions 724 are formed around the first opening portion 723. The entirety of the first opening portion 723 and the entireties of the respective second opening portions 724 fall within the sensor region 722. In the sensor region 722, the first opening portion 723 is disposed at a middle portion, and the plurality of second opening portions 724 are disposed at positions near a boundary of the sensor region 722.

As illustrated in FIG. 5, two sensor regions 722 are disposed in the adhesive portion 72 on the Y-axis negative direction side with respect to the gas path portion 71. In other words, two sensor regions 722 are disposed on the Y-axis negative direction side with respect to the center of the bus bar frame 17 in the Y axis direction.

As illustrated in FIG. 2, the connector portion 89 of the detection circuit or the control circuit that the connection unit 80 includes is disposed on the Y-axis negative direction side with respect to the center of the connection unit 80 in the Y axis direction. Wiring (not illustrated) led out from the sensor 81 (sensor body 82) that is disposed in the sensor region 722 is electrically connected to the connector portion 89. Specifically, the connector portion 89 is disposed in a posture where a terminal portion to which the wiring of the sensor 81 is connected faces a Y-axis negative direction side. As viewed in the Z axis direction, the connection unit 80 is disposed substantially at the middle of the bus bar frame 17, and the connector portion 89 is disposed substantially at the middle of the bus bar frame 17 in the X axis direction.

Both the connector portion 89 and the sensor region 722 of the connection unit 80 are arranged in an aligned manner on the Y-axis negative direction side with respect to the center in the Y axis direction of the bus bar frame 17. With such a configuration, the wiring (not illustrated) led out from the sensor 81 (sensor body 82) can be arranged on the same Y-axis negative direction side as the connector portion 89. Therefore, it is not necessary to excessively route the wiring led out from the sensor 81. That is, the wiring can be easily connected to the detection circuit of the connection unit 80 while suppressing the increase of a length of the wiring.

On the other hand, as illustrated in FIG. 5, in the embodiment, sensor regions 722 are not disposed on the adhesive portion 72 on the Y-axis positive direction side with respect to the gas path portion 71. Therefore, in the adhesive portion 72 on the Y-axis positive direction side with respect to the gas path portion 71, the adhesive layer 79 is disposed over the entire region from one end side to the other end side in the X axis direction.

The first opening portion 723 has an opening shape that corresponds to the shape of the detection surface 87 as viewed in a plan view. The second opening portion 724 has an opening shape smaller than the opening shape of the first opening portion 723. The second opening portions 724 are disposed around the first opening portion 723. Specifically, as illustrated in FIG. 6, the second opening portions 724 are disposed in the vicinity of the first opening portions 723 at an interval shorter than a length of the first opening portion 723 in the Y axis direction. More preferably, the second opening portions 724 are disposed in the vicinity of the first opening portion 723 at an interval shorter than a length of the second opening portion 724 in the Y axis direction.

As illustrated in FIG. 4 and FIG. 5, the bus bar mounting portions 73 are a pair of portions that sandwich the gas path portion 71 and the pair of adhesive portions 72 in the Y axis direction. The bus bar mounting portions 73 extend in the X axis direction respectively. The bus bar mounting portions 73 are disposed within a range from both end portions of the bus bar frame 17 in the Y axis direction by a length of L/4. The bus bar mounting portion 73 is a portion where the plurality of bus bars 33 are mounted. A plurality of bus bar opening portions 17*a* are formed in the bus bar mounting portion 73. The plurality of bus bar opening portions 17*a* are formed so as to expose portions of the respective bus bars 33 which are connected to the energy storage devices 20.

The plurality of pairs of ribs 751 to 753 are erected from an inner surface of the bus bar frame 17, and extend in the X axis direction. Distal end portions of the plurality of pairs of ribs 751 to 753 are brought into contact with the lid bodies 220 of the containers 21 of the energy storage devices 20. The plurality of pairs of ribs 751 to 753 have a function of increasing a strength of the bus bar frame 17. In the embodiment, the pair of ribs 751 and the pair of ribs 752 also function as portions that restrict the positions of the adhesive layers 79. Specifically, as illustrated in FIG. 4 and FIG. 5, on the bus bar frame 17, the pair of ribs 751 is disposed at positions where the pair of ribs 751 sandwiches the gas path portion 71 in the Y axis direction. On the bus bar frame 17, the pair of respective ribs 752 is disposed at positions where the pair of respective ribs 752 sandwiches the adhesive portions 72 together with the pair of ribs 751. With such a configuration, the adhesive portion 72 is sandwiched between the rib 751 and the rib 752. Accordingly, an adhesive (adhesive layer 79) that is applied to the adhesive portion 72 is restricted by the rib 751 and the rib 752.

On the bus bar frame 17, each of the pair of ribs 753 is disposed at positions where each of the pair of ribs 753 sandwich the bus bar mounting portion 73 together with the pair of ribs 752. That is, one of the pair of ribs 753 is disposed at an end portion of the bus bar frame 17 on a Y-axis negative direction side, and the other of the pair of ribs 753 is disposed at an end portion of the bus bar frame 17 on the Y-axis positive direction side.

A plurality of recessed portions 754 are formed on the plurality of pairs of ribs 751 to 753. The plurality of recessed portions 754 are formed at positions that correspond to edge portions of the respective energy storage devices 20. There may be a case where an insulating film may be wound around the energy storage device 20 in order to ensure insulation against the energy storage device 20 disposed adjacently to the energy storage device 20. In a state where the insulating film is wound around the container 21 of the energy storage device 20, there may be a case where a part of the insulating film protrudes from an upper end portion of the container 21. In such a case, the part of the insulating film that protrudes from the upper end portion of the container 21 is accommodated in the recessed portion 754 formed on each rib 751 to 753. Accordingly, the interference between the insulating film and the bus bar frame 17 can be suppressed.

Next, the sensor 81 is described in detail. As illustrated in FIG. 6, the sensor 81 includes a sensor body 82 and a mounting member 83.

The sensor body 82 is a part that detects a state of the energy storage device 20. The sensor body 82 is formed in a rectangular shape as viewed in a plan view, and an outer surface of the sensor body 82 forms a detection surface 821. The sensor body 82 includes wiring (not illustrated) that is connected to the detection circuit of the connection unit 80.

The sensor body 82 has a substantially rectangular parallelepiped shape that is elongated in the X-axis direction. That is, the sensor body 82 is disposed such that the X-axis direction becomes the longitudinal direction. With respect to wiring that is led out from the sensor body 82, the wiring is led out along the X-axis direction from an end portion of the sensor body 82 in the X-axis direction. As described above, the sensor body 82 is disposed in the respective sensor regions 722 illustrated in FIG. 2. The wiring that is led out from the end portion of the sensor body 82 in the X axis direction extends toward the connector portion 89 arranged at the middle portion of the bus bar frame 17, and is connected to the connector portion 89 in a state where the wiring is disposed along the X axis direction. As a result, it is unnecessary to route the wiring more than necessary and hence, the wiring can be easily connected to the detection circuit of the connection unit 80.

As illustrated in FIG. 6, the mounting member 83 is a member for mounting the sensor body 82 on the bus bar frame 17. It is preferable that the mounting member 83 be made of a heat conductive member having a relatively high thermal conductivity. The mounting member 83 can be used by bending a plate member made of metal. The mounting member 83 is an integral body formed of an accommodating portion 84 and a pair of support portions 85. The mounting member 83 has substantially the same size as the sensor body 82 in the X-axis direction. The accommodating portion 84 is a portion for accommodating the sensor body 82, and is formed in a substantially U shape as viewed in the X axis direction. The detection surface 821 of the sensor body 82 is brought into contact with an inner bottom surface of the accommodating portion 84. On the other hand, a heat conductive sheet 88 having a relatively high thermal conductivity is laminated on an outer bottom surface of the accommodating portion 84. An outer surface of the heat conductive sheet 88 is brought into contact with the lid body 220 of the energy storage device 20. With such a configuration, heat generated from the energy storage device 20 can be transferred to the detection surface 821 of the sensor body 82 through the heat conductive sheet 88 and the mounting member 83. That is, it is safe to say that the outer surface of the heat conductive sheet 88 forms the detection surface 87 of the sensor 81. The heat conductive sheet 88 may be made of a resin or metal provided that the heat conductive sheet 88 has insulating property. The heat conductive sheet 88 is not brought into contact with the adhesive layer 79, and is spaced apart from the adhesive layer 79 on a plane in the X-axis direction and on a plane in the Y-axis direction. The heat conductive sheet 88 is disposed between the sensor body 82 and the energy storage device 20 as viewed in the X axis direction.

The pair of support portions 85 extends outward along the Y-axis direction from each of both end portions of the accommodating portion 84. The support portions 85 that form a pair are supported by the bus bar frame 17 respectively. Specifically, the support portions 85 that form a pair are fixed to the upper portion of the bus bar frame 17 by adhesion, fusing, welding, mechanical joining, or the like.

In a state where the mounting member 83 is mounted on the bus bar frame 17, the entirety of the detection surface 87 of the sensor 81 (the outer surface of the heat conductive sheet 88) is exposed by the first opening portion 723 in the sensor region 722. To be more specific, as illustrated in FIG. 6, the detection surface 87 protrudes from the sensor region 722 of the bus bar frame 17 toward the energy storage devices 20. A protruding amount H1 of the detection surface 87 from the bus bar frame 17 (a protruding amount from the surface of the sensor region 722) is equal to or more than a thickness t1 of the adhesive layer 79. In this state, the detection surface 87 of the sensor 81 is brought into contact with the surface of the lid body 220 of the energy storage device 20. As illustrated in FIG. 5, the adhesive layer 79 is disposed at the position where the adhesive layer 79 does not overlap with the detection surface 87 as viewed in a plan view by avoiding the detection surface 87 and the periphery of the detection surface 87. The phrase "as viewed in a plan view" means viewing from the normal direction (Z-axis direction) with respect to the surface of the lid body 220 to which the adhesive layer 79 is adhered.

In the embodiment, the case where the sensor 81 includes the heat conductive sheet 88 has been exemplified. However, the sensor 81 may not include the heat conductive sheet 88. In this case, the outer bottom surface of the accommodating portion 84 of the mounting member 83 can be used as the detection surface of the sensor 81. In a case where the sensor body 82 penetrates the accommodating portion 84 of the mounting member 83 and the detection surface 821 of the sensor body 82 protrudes from the outer bottom surface of the accommodating portion 84, the detection surface 821 can be used as the detection surface of the sensor 81.

[Adhering Step of Making Bus Bar Frame and Energy Storage Devices Adhere to Each Other]

Next, an adhering step of making the bus bar frame 17 and the energy storage devices 20 adhere to each other at the time of manufacturing the energy storage apparatus 1 is described.

Figure 7:
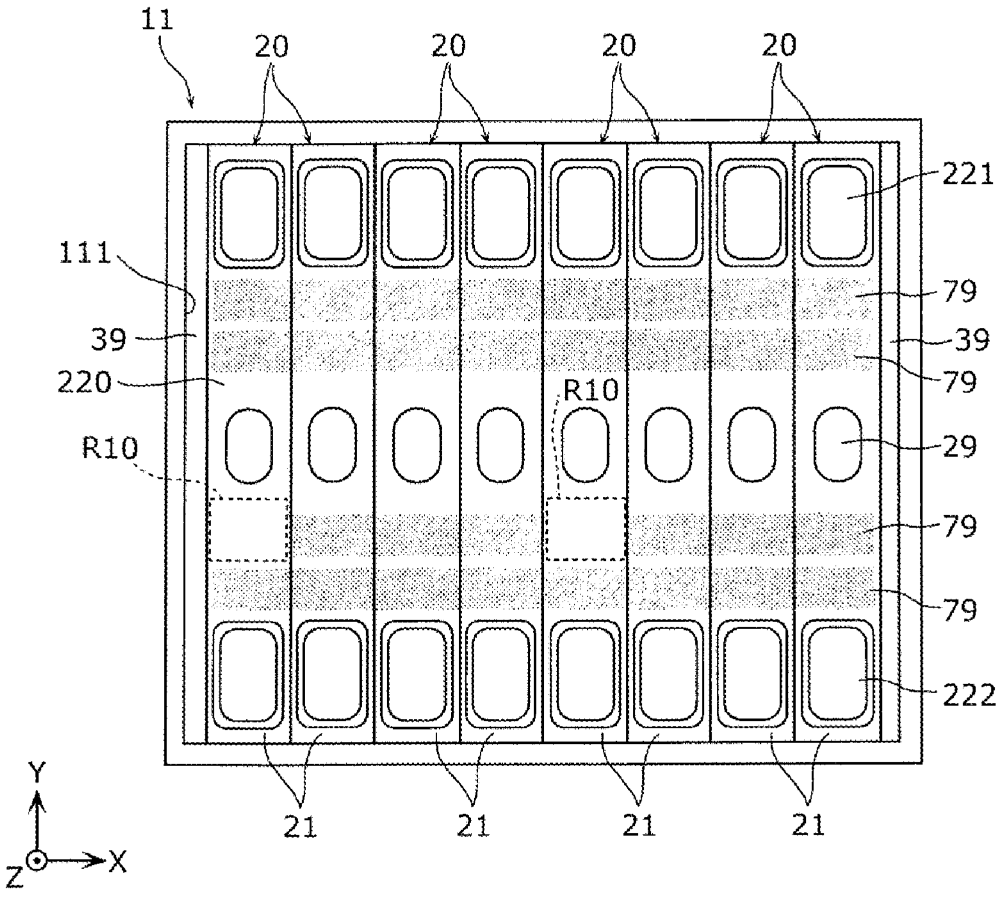
FIG. 7 is a plan view of a part of the energy storage apparatus in an adhering step according to the embodiment.
Figure 8:
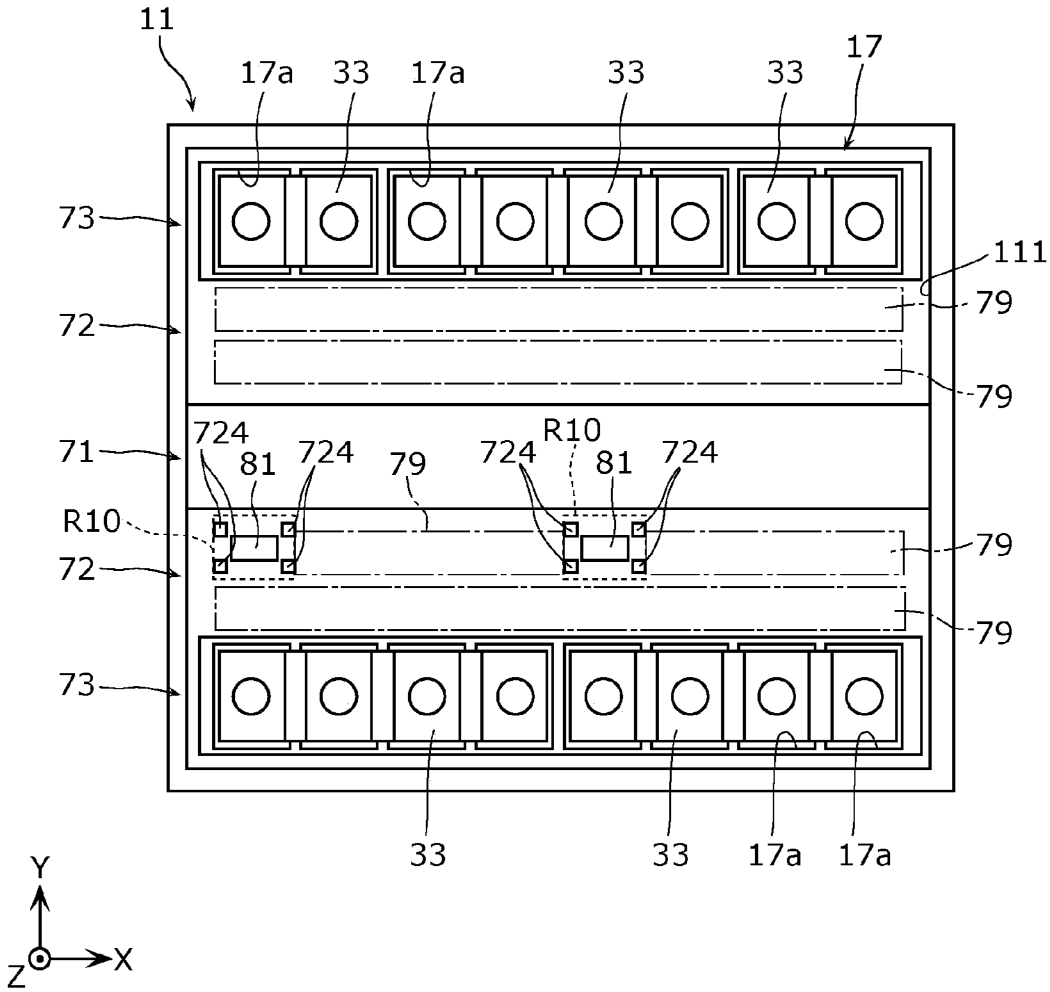
FIG. 8 is a plan view of a part of the energy storage apparatus in the adhering step according to the embodiment.

FIG. 7 and FIG. 8 are plan views of a part of the energy storage apparatus 1 in the adhering step according to the embodiment. To be more specific, FIG. 7 is a plan view illustrating the inside of the body portion 11 of the outer case 10 in which the plurality of energy storage devices 20 are accommodated. FIG. 8 is a plan view illustrating a state where the bus bar frame 17 is made to adhere to the plurality of energy storage devices 20. In FIG. 7, the adhesive layer 79 is illustrated by dot hatching, and in FIG. 8, the outer shape of the adhesive layer 79 is illustrated by a one-dot chain line.

As illustrated in FIG. 7, the plurality of energy storage devices 20 are accommodated in the body opening portion 111 of the body portion 11 in a state where the plurality of energy storage devices 20 are sandwiched between the pair of end plates 39. The plurality of energy storage devices 20 are fixed to the body portion 11 as follows. The bottom surfaces 213 of the containers 21 which are disposed on a side opposite to the lid bodies 220 of the containers 21 in the Z axis direction and an inner surface of the body portion 11 which opposedly faces the bottom surfaces 213 of the containers 21 in the Z axis direction are fixed to each other by an adhesive. The adhering step is performed in such a state. That is, the plurality of energy storage devices 20 are fixed to the body portion 11 by an adhesive, and are also fixed to the bus bar frame 17 by an adhesive. The adhesive layer is sandwiched between the plurality of energy storage devices 20 and the body portion 11, and the adhesive layer is sandwiched between the plurality of energy storage devices 20 and the bus bar frame 17.

Specifically, in the adhering step, an adhesive is applied to the lid bodies 220 of the respective containers 21 of the plurality of energy storage devices 20 by a dispenser or the like to form the adhesive layers 79. As an example of the adhesive, an adhesive using silicone as a material is named. At the time of applying the adhesive, the adhesive is applied by coating in a state where the applying of the adhesive is avoided at the portions corresponding to the respective sensor regions 722 (In FIG. 7, indicated by a rectangular shape drawn by a broken line). Such portions are referred to as non-coating-applied region R 10. By forming the non-coating-applied regions R10, the adhesive is applied while avoiding the first opening portions 723 at the middle portions of the respective sensor regions 722, that is, the detection surfaces 87 of the sensors 81.

On the other hand, with respect to the plurality of bus bars 33 and the bus bar frame 17, the plurality of bus bars 33 are assembled to the bus bar frame 17 so as to form an integral body, and the integral body is mounted on the plurality of energy storage devices 20 such that the adhesive layers 79 are sandwiched between the integral body and the plurality of energy storage devices 20 (see FIG. 6 and FIG. 8). In this case, the bus bar frame 17 is pressed to the adhesive layer 79 disposed on the plurality of energy storage devices 20. In such a pressing operation, the adhesive layer 79 is pressed by the bus bar frame 17 and hence, the adhesive layer 79 is spread more by pressing compared to a state immediately after the adhesive is applied.

In this case, with respect to the adhesive layer 79 that is spread by pressing, the further spreading of the adhesive layer 79 is restricted by the ribs 751 and the ribs 752. When the adhesive layer 79 is spread by pressing, the adhesive layer 79 intrudes also into the non-coating applied region R10. However, the adhesive layer 79 minimally reaches the detection surface 87 (the first opening portion 723) of the sensor 81 disposed at the middle portion of the non-coating applied region R10 (see FIG. 6). In particular, the plurality of second opening portions 724 are disposed around the first opening portions 723. Accordingly, the adhesive layer 79 that has intruded into the non-coating applied region R10 enters the second opening portions 724 so that the adhesive layer 79 further minimally reaches the detection surface 87. In such a state, the adhesive layer 79 is disposed at the position where the adhesive layer 79 does not overlap with the detection surface 87 of the sensor 81 as viewed in a plan view. Accordingly, it is possible to prevent the sensor 81 from receiving buoyancy from an adhesive that forms the adhesive layer 79.

After the bus bar frame 17 is mounted on the plurality of energy storage devices 20, the adhesive layer 79 is cured while applying a pressing force that is directed toward the plurality of energy storage devices 20 to the bus bar frame 17. The pressing force also acts on the sensors 81 at the time of curing, it is possible to suppress, with more certainty, the floating of the detection surfaces 87 of the sensors 81 from the energy storage devices 20.

As described above, the strength of the bus bar frame 17 is increased by the plurality of pairs of ribs 751 to 753. Therefore, even when a pressing force acts on the bus bar frame 17, the bus bar frame 17 is minimally deformed. That is, it is also possible to suppress floating of the sensors 81 from the energy storage devices 20 caused by deformation of the bus bar frame 17.

FIG. 6 illustrates a case where the protruding amount H1 of the detection surface 87 and the thickness t1 of the adhesive layer 79 are equal after curing. However, the adhesive layer 79 is avoided from the periphery of the detection surface 87, that is, from the periphery of the first opening portion 723. Accordingly, the elastic deformation of the bus bar frame 17 is possible around the first opening portion 723. As a result, when the protruding amount H1 of the detection surface 87 is larger than the thickness t1 of the adhesive layer 79, the bus bar frame 17 is elastically deformed so that the difference between the protruding amount H1 and the thickness t1 can be absorbed. Furthermore, a restoring force of the bus bar frame 17 acts on the detection surface 87 after the elastic deformation. Accordingly, it is possible to bring the detection surface 87 into contact with the energy storage device 20 with more certainty.

Specifically, according the embodiment, the case has been exemplified where, in the adhering step, the adhesive layers 79 are formed by applying an adhesive to the lid bodies 220 of the respective containers 21 of the plurality of energy storage devices 20. However, in the adhering step, the adhesive layers 79 may be formed by applying an adhesive to the bus bar frame 17.

Thereafter, the positive electrode terminals 221 and the negative electrode terminals 222 of the plurality of energy storage devices 20 are connected to the plurality of bus bars 33 by a welding method such as laser welding, or an outer edge portion of the bus bar frame 17 that is disposed at a position different and away from the adhesive layers 79 and the body portion 11 are fixed to each other by thermal caulking. Next, the connection unit 80 is disposed on the bus bar frame 17 on the positive side in the Z axis direction. During such an operation, wiring for temperature measurement using the sensor 81 and wiring for voltage measurement connected to the plurality of bus bars 33 are connected to the connector portion 89 of the connection unit 80. Next, a part of the outer lid 12 made of a resin and a part of the body portion 11 made of a resin are melted by heat, and the melted portions are pressed against each other so that the outer lid 12 is assembled to the body portion 11.

[Advantages and the Like]

As has been described above, the energy storage apparatus 1 according to the embodiment includes:

the energy storage devices 20; the sensors 81 mounted on the energy storage devices 20; the bus bar frame 17(holding member) disposed on the energy storage devices 20 and holding the sensors 81 in a state where the detection surface 87 of the sensor 81 is exposed toward the energy storage device 20; and the outer case 10 accommodating the energy storage devices 20, the sensors 81, and the bus bar frame 17 therein, wherein the adhesive layers 79 that join the bus bar frame 17 and the energy storage devices 20 to each other are interposed between the bus bar frame 17 and the energy storage devices 20, and the adhesive layers 79 are disposed at the positions where the adhesive layers 79 do not overlap with the detection surfaces 87 of the sensors 81 as viewed in a plan view.

With such a configuration, the adhesive layers 79 that join the bus bar frame 17 and the energy storage devices 20 to each other are disposed at the positions where the adhesive layer 79 does not overlap with the detection surface 87 of the sensor 81 as viewed in a plan view. Accordingly, it is possible to prevent the sensor 81 from directly receiving buoyancy from an adhesive that forms the adhesive layer 79. Accordingly, the contact property of the sensor 81 that is brought into contact with the energy storage devices 20 can be enhanced even when a biasing portion for pressing the sensor 81 is not provided. In this manner, the contact property of the sensor 81 with the energy storage devices 20 can be enhanced with a simple structure.

Particularly, the adhesive layer 79 is disposed while avoiding the periphery of the detection surface 87. Accordingly, an adhesive that forms the adhesive layer 79 minimally spreads in a wetted form to the detection surface 87. Accordingly, it is possible to prevent the sensor 81 from receiving buoyancy attributed to the adhesive with more certainty.

The adhesive layer 79 is disposed at the position where the adhesive layer 79 does not overlap with the detection surface 87 of the sensor 81 as viewed in a plan view. Accordingly, the adhesive layer 79 is not interposed on a heat conduction path that connects the energy storage device 20 and the detection surface of the sensor 81 to each other. As a result, the lowering of thermal conductivity attributed to the adhesive layer 79 can be minimized. In this manner, a state of the energy storage device 20 can be more accurately detected by enhancing the contact property of the sensor and by suppressing the lowering of thermal conductivity.

The detection surface 87 of the sensor 81 protrudes from the bus bar frame 17 toward the energy storage devices 20, and a protruding amount H1 of the detection surface 87 from the bus bar frame 17 is equal to or more than the thickness t1 of the adhesive layer 79.

With such a configuration, the protruding amount H1 of the detection surface 87 of the sensor 81 from the bus bar frame 17 is equal to or more than the thickness t1 of the adhesive layer 79. Accordingly, even when the bus bar frame 17 intends to float from a predetermined position by receiving buoyancy from the adhesive, it is possible to bring the detection surface 87 into contact with the energy storage device 20 with more certainty.

The second opening portions 724 (opening portions) may be formed on a surface of the bus bar frame 17 that faces the adhesive layer 79 and outward the detection surface 87 of the sensor 81.

The adhesive layers 79 are formed by applying an adhesive to the energy storage devices 20 or the bus bar frame 17, and by bringing the energy storage devices 20 and the bus bar frame 17 close to each other, and by pressing the energy storage devices 20 and the bus bar frame 17 to each other. During pressing, an adhesive spreads in a wetted form between the energy storage devices 20 and the bus bar frame 17. The second opening portions 724 are formed on the bus bar frame 17 and outward the detection surface 87. Accordingly, an adhesive that approaches the detection surface 87 by spreading in a wetted form intrudes into the second opening portions 724. Therefore, it is possible to prevent the adhesive from spreading in a wetted form toward a region in the vicinity of the detection surface 87. That is, it is possible to prevent the sensor 81 from receiving buoyancy attributed to the adhesive with more certainty.

The bus bar frame 17 holds the bus bars 33 that are connected to the energy storage devices 20, the bus bars 33 are disposed at an end portion of the bus bar frame 17, and the sensor 81 is disposed at a middle portion of the bus bar frame 17.

It is desirable that the bus bar frame 17 be strongly fixed to the energy storage devices 20 in the vicinity of the bus bars 33. Therefore, it is necessary to sufficiently apply an adhesive to the end portion of the bus bar frame 17 where the bus bars 33 are disposed. On the other hand, the middle portion of the holding member is away from the bus bars 33. Accordingly, it is also possible to suppress an amount of adhesive applied to the middle portion. The sensor 81 is disposed at the middle portion of the bus bar frame 17. Accordingly, even in a case where the adhesive layer 79 is disposed while avoiding the periphery of the detection surface 87 of the sensor 81, the fixing of the bus bar frame 17 is not significantly affected. Accordingly, the bus bar frame 17 can enhance the contact property of the sensor 81 that is brought into contact with the energy storage devices 20 while firmly fixing a region of the bus bar frame 17 in the vicinity of the bus bars 33.

Particularly, in the embodiment, the sensor regions 722 are disposed at positions closer to the middle portion than the end portion of the bus bar frame 17 on a Y-axis negative direction side by a length of L/4. Further, the bus bar mounting portion 73 is disposed within ranges from both end portions of the bus bar frame 17 in the Y-axis direction by a length of L/4 As a result, by merely disposing the sensors 81 in the sensor region 722, the sensors 81 can be disposed at the middle portion of the bus bar frame 17 with certainty. Further, by merely disposing the bus bars 33 in the bus bar mounting portions 73, the bus bars 33 can be disposed at the end portions of the bus bar frame 17 with certainty.

The sensor 81 has the pair of support portions 85 that sandwiches the detection surface 87, and the support portions 85 are supported by the bus bar frame 17.

With such a configuration, the sensor 81 is supported on the bus bar frame 17 by the pair of support portions 85 that sandwiches the detection surface 87. Accordingly, it is possible to make the sensor 81 minimally float even when the sensor 81 receives buoyancy from the adhesive. Therefore, it is possible to bring the detection surface 87 into contact with the energy storage devices 20 with more certainty.

(Miscellaneous)

The energy storage apparatus according to the embodiment of the present invention has been described heretofore. However, the present invention is not limited to the embodiment described above. That is, it should be construed that the embodiments disclosed herein are illustrative in all respects and are not limitative. The scope of the present invention is not defined by the description described above but is defined by the claims, and includes meanings equivalent to the claims and all modifications within the claims.

For example, in the embodiment described above, the bus bar frame 17 has been exemplified as an example of the holding member that holds the sensors 81. However, provided that the member holds the sensors 81 in a state where the detection surfaces 87 of the sensors 81 are exposed toward the energy storage devices 20, a member other than the bus bar frame 17 can be adopted as the holding member.

In the embodiment described above, the case has been exemplified where the adhesive layer 79 is disposed while avoiding the periphery of the detection surface 87 of the sensor 81. However, the adhesive layer 79 may be disposed at a position where the adhesive layer 79 does not overlap with only the detection surface 87 as viewed in a plan view. That is, the adhesive layer 79 may be disposed while avoiding only the detection surface 87.

In the embodiment, the case has been exemplified where the adhesive layer 79 is disposed while avoiding the periphery of the detection surface 87 of the sensor 81. However, a heat conductive adhesive layer may be interposed between the detection surface 87 of the sensor 81 and the energy storage devices 20. Specifically, for example, such a configuration can be realized by replacing the heat conductive sheet 88 illustrated in FIG. 6 with a heat conductive adhesive layer. In this case, the heat conductive adhesive layer is not included as a part of the sensor 81, and serves as a part that joins the sensor 81 and the energy storage devices 20 to each other. The heat conductive adhesive layer is formed of an adhesive having thermal conductivity higher than thermal conductivity of the adhesive layer 79. It is sufficient that the heat conductive adhesive layer be formed of an adhesive having thermal conductivity equal to or higher than thermal conductivity of the mounting member 83. Alternatively, it is sufficient that the heat conductive adhesive layer be formed of an adhesive having thermal conductivity equal to or higher than thermal conductivity of the container 21 of the energy storage device 20.

With such a configuration, the heat conductive adhesive layer that joins the sensor 81 and the energy storage devices 20 to each other is interposed between the detection surface 87 of the sensor 81 and the energy storage devices 20. Accordingly, it is possible to suppress lowering of thermal conductivity on the heat conductive path that connects the energy storage device 20 and the detection surface 87 of the sensor 81. Accordingly, a state of the energy storage device 20 can be detected with more certainty.

In a case where a heat conductive adhesive layer is interposed between the detection surface 87 of the sensor 81 and the energy storage device 20, the adhesive layer 79 may not be formed.

In the embodiment described above, the case has been described where the plurality of second opening portions 724 are formed on the periphery of the first opening portion 723. However, the number of second opening portions 724 may be one or the second opening portions 724 may not be formed.

In the embodiment described above, the case has been exemplified where the sensor 81 is disposed at the middle portion of the bus bar frame 17. However, the sensor 81 may be disposed at the end portion of the bus bar frame 17.

In the embodiment described above, the sensor 81 having the pair of support portions 85 has been exemplified. However, it is sufficient that the sensor 81 has at least one support portion 85.

In the embodiment described above, the energy storage apparatus 1 that includes the plurality of energy storage devices 20 has been exemplified. However, the energy storage apparatus 1 may be an energy storage apparatus that includes one energy storage device.

The configurations that are formed by arbitrarily combining the respective constituent elements that the embodiment includes also fall within the scope of the present invention.

INDUSTRIAL APPLICABILITY

The present invention is applicable to an energy storage apparatus that includes energy storage devices such as lithium ion secondary batteries or the like.

DESCRIPTION OF REFERENCE SIGNS

1: energy storage apparatus
10: outer case
11: body portion
12: outer lid
17: bus bar frame
17*a*: bus bar opening portion
20: energy storage device
21: container
29: gas release valve
33: bus bar
39: end plate
71: gas path portion
72: adhesive portion
73: bus bar mounting portion
79: adhesive layer
80: connecting unit
81: sensor
82: sensor body
83: mounting member
84: accommodating portion
85: support portion
87: detection surface
88: heat conductive sheet
89: connector portion
91, 92: external terminal
111: body opening portion
210: container body
211: long side surface
212: short side surface
213: bottom surface
220: lid body
221: positive electrode terminal
222: negative electrode terminal
721: adhesive region
722: sensor region
723: first opening portion
724: second opening portion (opening portion)
751, 752, 753: rib
754: recessed portion
821: detection surface
H1: protruding amount
R10: adhesive non-applied region
t1: thickness

The invention claimed is:

1. An energy storage apparatus comprising:
an energy storage device comprising a battery module;
a sensor mounted on the energy storage device;
a holding member disposed on the energy storage device and holding the sensor in a state where a detection surface of the sensor is exposed toward the energy storage device; and
an outer case accommodating the energy storage device, the sensor, and the holding member therein,
wherein an adhesive layer that joins the holding member and the energy storage device to each other is interposed between the holding member and the energy storage device,
wherein the holding member includes a wall portion disposed between a first opening portion of the holding member, in which the sensor is disposed, and a second opening portion of the holding member at a periphery of the first opening portion,
wherein the second opening portion is configured so that the energy storage device is visually recognizable from an outside,
wherein the adhesive layer is disposed at a position where the adhesive layer does not overlap with the detection surface of the sensor as viewed in a plan view,
wherein the adhesive layer is not disposed at a position between the wall portion and the energy storage device as viewed in a plan view,
wherein a space is formed between the wall portion and the energy storage device, and
wherein the second opening portion is a through-opening formed through the holding member such that a surface of the energy storage device is exposed and visible through the second opening portion from outside the holding member.

2. The energy storage apparatus according to claim 1, wherein
the detection surface of the sensor protrudes from the holding member toward the energy storage device, and
a protruding amount of the detection surface from the holding member is equal to or more than a thickness of the adhesive layer.

3. The energy storage apparatus according to claim 1, wherein
the holding member holds a bus bar that is connected to the energy storage device,
the bus bar is disposed at an end portion of the holding member, and
the sensor is disposed at a middle portion of the holding member.

4. The energy storage apparatus according to claim 1, wherein the sensor includes a pair of support portions that sandwiches the detection surface, and the pair of support portions is supported by the holding member.

5. The energy storage apparatus according to claim 1, wherein the adhesive layer is disposed so as to avoid a periphery of the detection surface.

6. An energy storage apparatus comprising:

an energy storage device comprising a battery module;

a sensor mounted on the energy storage device;

a holding member disposed on the energy storage device and holding the sensor in a state where a detection surface of the sensor is exposed toward the energy storage device; and an outer case accommodating the energy storage device, the sensor, and the holding member therein, wherein the holding member includes a first opening portion of the holding member, in which the sensor is disposed, and a second opening portion of the holding member at a periphery of the first opening portion, wherein the second opening portion is configured so that the energy storage device is visually recognizable from an outside, wherein an adhesive layer that joins the holding member and the energy storage device to each other is interposed between the holding member and the energy storage device and is disposed at a position spaced from the first opening portion with respect to the second opening portion, wherein a heat conductive adhesive layer that joins the sensor and the energy storage device to each other is interposed between the detection surface of the sensor and the energy storage device, wherein a thermal conductivity of the heat conductive adhesive layer is higher than a thermal conductivity of the adhesive layer, and wherein the second opening portion is a through-opening formed through the holding member such that a surface of the energy storage device is exposed and visible through the second opening portion from outside the holding member.

7. The energy storage apparatus according to claim 1, wherein the sensor includes a sensor body, a mounting member accommodating the sensor body, and a heat conductive sheet disposed on the mounting member, and wherein the heat conductive sheet is brought into contact with the energy storage device.

8. The energy storage apparatus according to claim 1, wherein a heat conductive sheet that joins the sensor and the energy storage device to each other is interposed between the detection surface of the sensor and the energy storage device, and wherein a thermal conductivity of the heat conductive sheet is higher than a thermal conductivity of the adhesive layer.

9. The energy storage apparatus according to claim 7, wherein a heat conductive sheet that joins the sensor and the energy storage device to each other is interposed between the detection surface of the sensor and the energy storage device, and wherein a thermal conductivity of the heat conductive sheet is higher than a thermal conductivity of the adhesive layer.

10. The energy storage apparatus according to claim 6, wherein the sensor includes a sensor body and a mounting member accommodating the sensor body.

11. The energy storage apparatus according to claim 6, wherein the detection surface of the sensor protrudes from the holding member toward the energy storage device, and a protruding amount of the detection surface from the holding member is equal to or more than a thickness of the adhesive layer.

12. The energy storage apparatus according to claim 6, wherein the holding member holds a bus bar that is connected to the energy storage device, the bus bar is disposed at an end portion of the holding member, and the sensor is disposed at a middle portion of the holding member.

13. An energy storage apparatus comprising:

an energy storage device comprising a battery module;

a sensor mounted on the energy storage device;

a holding member disposed on the energy storage device and holding the sensor in a state where a detection surface of the sensor is exposed toward the energy storage device; and an outer case accommodating the energy storage device, the sensor, and the holding member therein, wherein the holding member includes a first opening portion of the holding member, in which the sensor is disposed, and a second opening portion of the holding member at a periphery of the first opening portion, wherein the second opening portion is configured so that the energy storage device is visually recognizable from an outside, wherein an adhesive layer that joins the holding member and the energy storage device to each other is interposed between the holding member and the energy storage device and is disposed at a position spaced from the first opening portion with respect to the second opening portion, wherein the adhesive layer is disposed at a position where the adhesive layer does not overlap with the detection surface of the sensor as viewed in a plan view, wherein the sensor includes a sensor body, a mounting member accommodating the sensor body, and a heat conductive sheet disposed on the mounting member, wherein the heat conductive sheet is brought into contact with the energy storage device, and wherein the second opening portion is a through-opening formed through the holding member such that a surface of the energy storage device is exposed and visible through the second opening portion from outside the holding member.

14. The energy storage apparatus according to claim 13, wherein a thermal conductivity of the heat conductive sheet is higher than a thermal conductivity of the adhesive layer.

15. The energy storage apparatus according to claim 13, wherein the detection surface of the sensor protrudes from the holding member toward the energy storage device, and a protruding amount of the detection surface from the holding member is equal to or more than a thickness of the adhesive layer.

16. The energy storage apparatus according to claim 13, wherein the holding member holds a bus bar that is connected to the energy storage device, the bus bar is disposed at an end portion of the holding member, and the sensor is disposed at a middle portion of the holding member.

17. The energy storage apparatus according to claim 1, wherein the second opening portion is a through-opening formed through the holding member that receives adhesive intruding from the adhesive layer toward the detection surface, thereby preventing the adhesive layer from reaching the detection surface.

18. The energy storage apparatus according to claim 1, wherein the second opening portion is positioned outward of the detection surface of the sensor and is configured to receive adhesive intruding from the adhesive layer toward the detection surface, such that the adhesive layer does not reach the detection surface of the sensor.

19. The energy storage apparatus according to claim 6, wherein the heat conductive adhesive layer and the adhesive layer are discrete layers that are spaced apart from each other as viewed in a plan view.

20. The energy storage apparatus according to claim 13, wherein the heat conductive sheet is spaced apart from the adhesive layer in both a first horizontal direction and a second horizontal direction perpendicular to the first horizontal direction as viewed in a plan view.

21. The energy storage apparatus according to claim 13, wherein the heat conductive sheet is laminated on an outer surface of the mounting member, the heat conductive sheet is spaced apart from the adhesive layer in a first direction along a surface of the energy storage device and in a second direction along the surface of the energy storage device perpendicular to the first direction, the adhesive layer has a thermal conductivity lower than a thermal conductivity of the heat conductive sheet.

* * * * *